US012497090B2

United States Patent
Moritsu et al.

(10) Patent No.: US 12,497,090 B2
(45) Date of Patent: Dec. 16, 2025

(54) VEHICLE STEERING HANDLE

(71) Applicant: TOYOTA JIDOSHA KABUSHIKI KAISHA, Toyota (JP)

(72) Inventors: Keita Moritsu, Okazaki (JP); Mari Sato, Toyota (JP); Yoshito Watanabe, Nisshin (JP); Yutaro Yamamoto, Okazaki (JP); Ryutaro Misumi, Toyota (JP); Kazuyoshi Shirai, Toyota (JP); Takatoshi Ohya, Toyota (JP); Kohei Nohara, Okazaki (JP); Yasuhiko Fukuzumi, Nagoya (JP); Ryunosuke Yamada, Toyota (JP); Sei Kobayashi, Toyota (JP); Akihiro Suzuki, Susono (JP); Go Tanaka, Shizuoka-ken (JP); Seiji Toriu, Shizuoka-ken (JP); Minoru Takayama, Miyoshi (JP); Hiromasa Okadome, Toyoake (JP); Kazunari Abe, Toyota (JP); Yuta Kamiya, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 18/888,553

(22) Filed: Sep. 18, 2024

(65) Prior Publication Data

US 2025/0100610 A1    Mar. 27, 2025

(30) Foreign Application Priority Data

Sep. 25, 2023   (JP) .................................. 2023-159344

(51) Int. Cl.
*B62D 1/04*      (2006.01)
*B60K 26/02*     (2006.01)
(Continued)

(52) U.S. Cl.
CPC .............. *B62D 1/046* (2013.01); *B60K 26/02* (2013.01); *B60Q 1/0082* (2013.01); *B60T 7/102* (2013.01);
(Continued)

(58) Field of Classification Search
CPC . B62D 1/04; B62D 1/046; B62D 1/06; B60K 26/02; B60K 2026/025;
(Continued)

(56) References Cited

U.S. PATENT DOCUMENTS

| 4,143,734 | A | * | 3/1979 | Bhattacharya | ......... B60K 26/02 |
| | | | | | 74/484 R |
| 4,836,325 | A | * | 6/1989 | Enokimoto | .......... B62D 21/183 |
| | | | | | 188/344 |
| 12,291,260 | B2 | * | 5/2025 | Morita | ..................... B62D 1/06 |
| 2004/0108161 | A1 | * | 6/2004 | Ohno | .................... B60W 10/06 |
| | | | | | 180/315 |

(Continued)

FOREIGN PATENT DOCUMENTS

| EP | 3287309 | A1 | * | 2/2018 | ............. B62D 1/046 |
| JP | H0226995 | U | * | 2/1990 | |

(Continued)

OTHER PUBLICATIONS

Definition of "around" by The Free Dictionary; https://www.thefreedictionary.com/around; Jun. 1, 2025 (Year: 2025).*

*Primary Examiner* — Keith J Frisby
(74) *Attorney, Agent, or Firm* — SoraIP, Inc.

(57) ABSTRACT

A vehicle steering handle, comprising: a steering wheel that is an isosceles trapezoidal annular body composed of an upper bottom portion, a lower bottom portion longer than the upper bottom portion, and left and right leg portions; an accelerator lever attached to the right leg portion; and a brake lever attached to the left leg portion and the right leg portion.

11 Claims, 5 Drawing Sheets

(51) Int. Cl.
*B60Q 1/00* (2006.01)
*B60T 7/10* (2006.01)
*B62D 1/06* (2006.01)

(52) U.S. Cl.
CPC ..... *B60K 2026/028* (2013.01); *Y10T 74/2039* (2015.01); *Y10T 74/20396* (2015.01); *Y10T 74/20834* (2015.01)

(58) Field of Classification Search
CPC ..... B60K 2026/028; B60T 7/10; B60T 7/102; B60T 7/08; B60L 2250/24; B60L 2200/24; Y10T 74/20396; Y10T 74/20384; Y10T 74/2039; Y10T 74/20834
USPC ......... 180/333, 315, 335; 74/55, 484 R, 491, 74/501.6, 502.2, 490.12, 490.14, 490.15; 280/778
See application file for complete search history.

(56) References Cited

U.S. PATENT DOCUMENTS

2019/0366848 A1* 12/2019 Yamada ............... B60K 35/50
2024/0326893 A1* 10/2024 Yamada ............... B32B 9/047

FOREIGN PATENT DOCUMENTS

| JP | H07255787 A | * | 10/1995 | |
| JP | 2000237245 A | * | 9/2000 | |
| JP | 2002160641 A | * | 6/2002 | |
| JP | 2004136795 A | * | 5/2004 | |
| JP | 2008014204 A | * | 1/2008 | |
| JP | 2013199147 A | * | 10/2013 | |
| JP | 2014-052887 A | | 3/2014 | |
| JP | 2019156022 A | * | 9/2019 | |
| JP | 2022-135592 A | | 9/2022 | |
| KR | 19980013565 U | * | 6/1998 | |
| WO | WO-2007051523 A1 | * | 5/2007 | ............. B60K 20/06 |

* cited by examiner

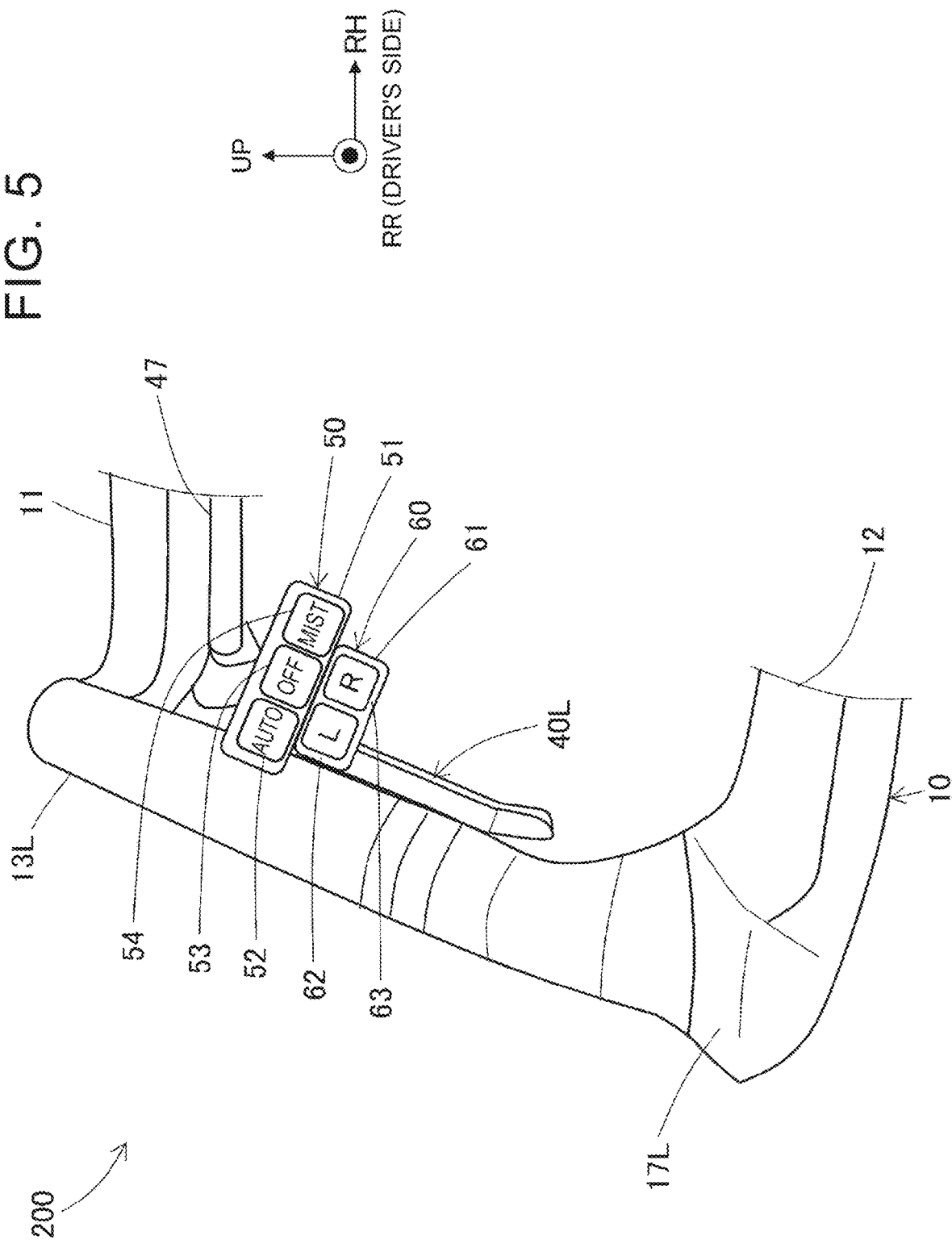

VEHICLE STEERING HANDLE

CROSS-REFERENCE TO RELATED APPLICATION

This application claims priority to Japanese Patent Application No. 2023-159344 filed on Sep. 25, 2023, incorporated herein by reference in its entirety.

BACKGROUND

1. Technical Field

The present disclosure relates to the structure of a vehicle steering handle.

2. Description of Related Art

A driving device for the disabled has been proposed. For example, Japanese Unexamined Patent Application Publication No. 2014-52887 (JP 2014-52887 A) discloses a driving device in which a joystick is used in place of a handle, an accelerator, and a brake. JP 2014-52887 A also discloses a driving device constituted from a joystick and an auxiliary handle that is operable by a driver.

Japanese Unexamined Patent Application Publication No. 2022-135592 (JP 2022-135592 A) discloses a driving device that allows performing a braking operation with a thumb of a driver holding a handle and performing an accelerator operation with a finger other than the thumb.

SUMMARY

In the driving device described in JP 2014-52887 A, it is necessary to move the joystick in the front-rear direction at the time of acceleration and deceleration, and thus there is a possibility that the burden on the hand of the driver increases when driving for a long time. In the case of the driving device described in JP 2022-135592 A, the brake operation is performed with the thumb and the accelerator operation is performed with a finger other than the thumb, and thus the driving operation is not intuitive, and is not easy for some drivers.

Therefore, an object of the present disclosure is to provide a vehicle steering handle that is easily operable by a driver and imposes a small burden on the driver.

An aspect of the present disclosure provides a vehicle steering handle including:
- a trapezoidal steering wheel;
- an accelerator lever attached to one or both of leg portions; and
- a brake lever attached to one or both of the leg portions.

With this configuration, the driver can steer, accelerate, and decelerate the vehicle by gripping the leg portion of the steering wheel, and thus the driving operation is facilitated and the burden of the driving operation on the driver can be reduced.

In the vehicle steering handle according to the present disclosure, the steering wheel may be an isosceles trapezoid annular body including an upper base portion, a lower base portion longer than the upper base portion, and right and left leg portions.

This further facilitates the driving operation.

In the vehicle steering handle according to the present disclosure,
the right and left leg portions may be inclined with respect to an up-down direction; and
an angle of inclination may be in a range of 10 to 30 degrees.

Accordingly, the angle of bending the wrist when the steering wheel is rotated can be reduced, and the burden of the driving operation on the driver can be reduced.

In the vehicle steering handle according to the present disclosure, the accelerator lever may be rotatably attached around the leg portion such that an operation end is on an inner peripheral side of the steering wheel, and adjust an accelerator operation amount according to a rotation angle; and
the brake lever may include an upper end portion rotatably attached to the leg portion such that a lower end portion of the brake lever comes into contact with and separates from the leg portion and the lower end portion moves forward and backward with respect to a driver side, and adjust a braking force according to a stroke of the lower end portion with respect to the leg portion.

Accordingly, when the driver grips the leg portion of the steering wheel, the driver can adjust the accelerator operation amount by rotating the accelerator lever with the thumb, and can adjust the braking force by gripping the brake lever with a finger other than the thumb. Therefore, the driving operation is facilitated, and the burden of the driving operation on the driver can be reduced. Further, the driving operation is rendered intuitive, and thus the driving operation is facilitated also in this respect.

The vehicle steering handle according to the present disclosure may further include
a turn switch and a wiper switch provided on one or both of the leg portions.

Accordingly, the driver can operate the turn switch and the wiper switch, in addition to steering, accelerating, and decelerating the vehicle, by gripping the leg portion of the steering wheel, and thus the driving operation is facilitated and the burden of the driving operation on the driver can be reduced.

The present disclosure can provide a vehicle steering handle that is easily operable by a driver and imposes a small burden on the driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is an elevation view illustrating a turn switch and a wiper switch attached to a left leg portion of a vehicle steering handle according to another embodiment.

DETAILED DESCRIPTION OF EMBODIMENTS

Hereinafter, a vehicle steering handle 100 according to an embodiment will be described with reference to the drawings. The vehicle steering handle 100 is a device that is connected to the steering column 25 of the vehicle and performs steering of the vehicle by a driver's rotation operation.

Figure 1:
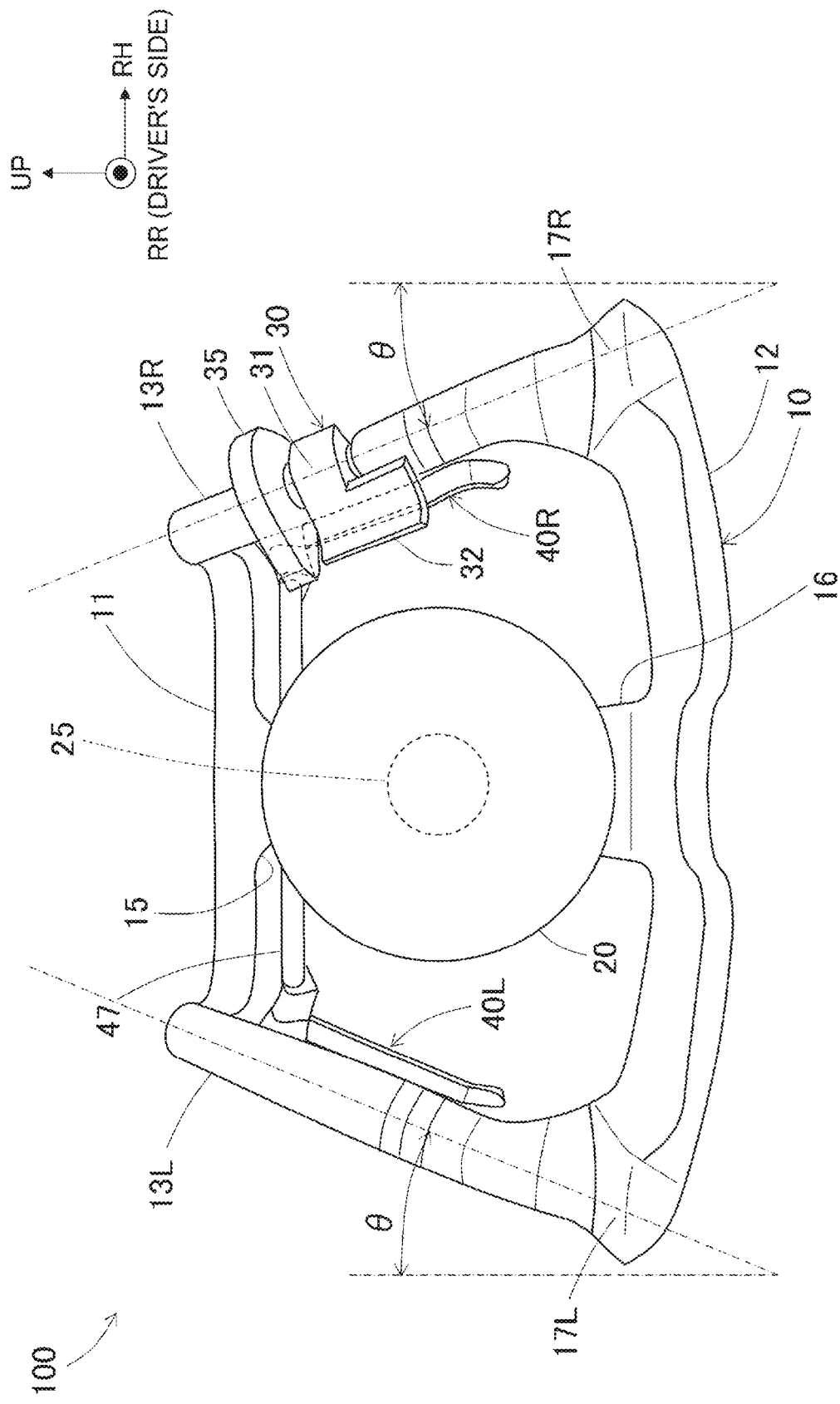
FIG. 1 is an elevation view of a vehicle steering handle of an embodiment in a neutral position as viewed from a driver side.

As illustrated in FIG. 1, the vehicle steering handle 100 includes a steering wheel 10, a base 20, an accelerator lever 30, and a brake lever 40L, 40R. Note that the arrow RR, the arrow UP, and the arrow RH shown in the drawings indicate the rear side, the upper side, and the right side of the vehicle when the vehicle steering handle 100 is attached to the vehicle. When the vehicle steering handle 100 is attached to the vehicle, the rear direction of the vehicle steering handle 100 is the driver side. Hereinafter, in the case of simply describing the front-rear direction, the left-right direction, and the up-down direction, the front-rear direction, the left-right direction, and the up-down direction in the front-rear direction in a state in which the vehicle steering handle 100 is attached to the vehicle are shown unless otherwise specified.

As shown in FIG. 1, the steering wheel 10 is an isosceles trapezoidal ring composed of an upper bottom portion 11, a lower bottom portion 12 longer than the upper bottom portion 11, a left leg portion 13L, and a right leg portion 13R. The base 20 is a frame structure arranged in the center of the steering wheel 10 and connected to the steering column 25.

The upper bottom portion 11 of the steering wheel 10 is a longitudinal member that extends in the left-right direction of the vehicle on the upper side of the base 20 when the vehicle steering handle 100 is in the neutral position shown in FIG. 1. The upper bottom portion 11 is connected to the top of the base 20 by an upper spoke 15. The lower bottom portion 12 is a longitudinal member that extends in the left-right direction of the vehicle under the base 20 when the vehicle steering handle 100 is in the neutral position shown in FIG. 1. The lower bottom portion 12 is connected to the lower portion of the base 20 by a lower spoke 16. A trim of a grip is attached to the outer surface of the lower bottom portion 12 so that the driver can grasp the lower bottom portion 12.

The left leg portion 13L is a cylindrical member that obliquely connects the left end of the upper bottom portion 11 and the left end of the lower bottom portion 12. As shown in FIG. 1, the left leg portion 13L is inclined by an angle θ with respect to the up-down direction when the vehicle steering handle 100 is in the neutral position shown in FIG. 1. The right leg portion 13R is a cylindrical member symmetrical to the left leg portion 13L and connecting the right end of the upper bottom portion 11 and the right end of the lower bottom portion 12 obliquely vertically. Like the left leg portion 13L, the right leg portion 13R is inclined by an angle θ with respect to the vertical direction when the vehicle steering handle 100 is in the neutral position shown in FIG. 1. In the vehicle steering handle 100 of the embodiment, the angle θ is about 20 degrees, but the angle θ is not limited thereto, and may be appropriately set between 10 degrees and 30 degrees. Gripped trims are attached to the outer surfaces of the left leg portion 13L and the right leg portion 13R to allow the driver to grasp the left leg portion 13L and the right leg portion 13R. The length of the lower bottom portion 12 in the left-right direction is longer than the length of the upper bottom portion 11 in the left-right direction, and the length of the left leg portion 13L and the length of the right leg portion 13R are the same, so that the upper bottom portion 11, the lower bottom portion 12, the left leg portion 13L, and the right leg portion 13R constitute an isosceles trapezoidal ring.

The lower end of the left leg portion 13L is connected to the left end of the lower bottom portion 12. Therefore, the left end of the lower bottom portion 12 protrudes toward the driver side from the driver side of the left leg portion 13L. This protruding part constitutes a rotary operating portion 17L that allows the driver to rotate the steering wheel 10 on the palm of the hand. Similarly, a lower end of the right leg portion 13R is connected to a vehicle-front side of a right end of the lower bottom portion 12. At a right end of the lower bottom portion 12, a rotary operation portion 17R is formed which protrudes from the driver side surface of the right leg portion 13R toward the driver side and allows the driver to rotate the steering wheel 10 on the palm of the hand.

Figure 2:
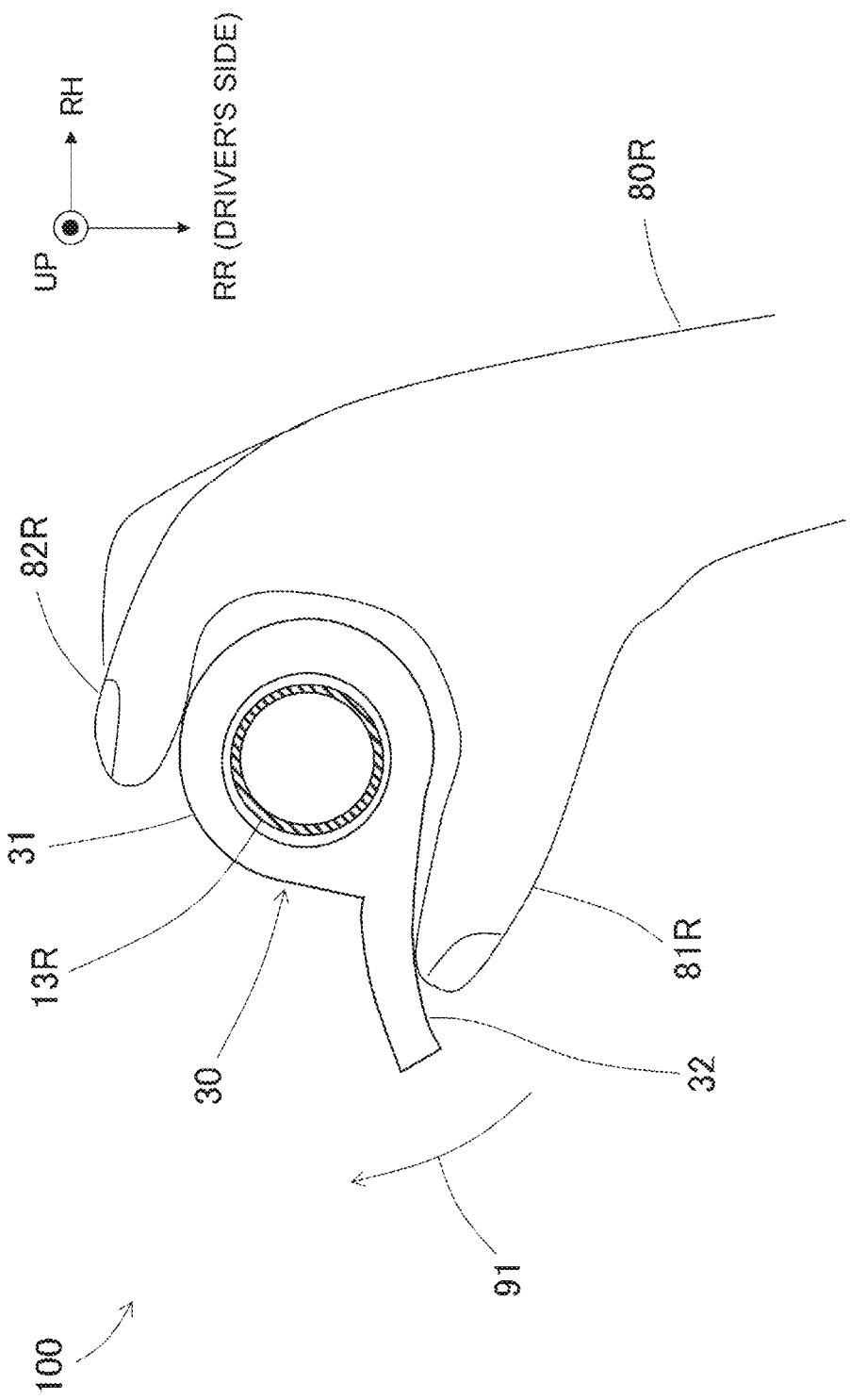
FIG. 2 is a top plan view of the accelerator lever shown in FIG. 1.

As shown in FIG. 1, an accelerator lever 30 and an accelerator angle sensor 35 are attached to the right leg portion 13R. As illustrated in FIG. 2, the accelerator lever 30 includes an annular portion 31 that is rotatably attached to the right leg portion 13R, and an operating end 32 that protrudes from the annular portion 31 toward the inner circumference of the steering wheel 10. The accelerator angle sensor 35 detects the angular position of the annular portion 31 and outputs the detected angular position to a control unit (not shown). The control unit adjusts the accelerator operation amount in accordance with the input rotational angle position of the annular portion 31. As indicated by the arrow 91 in FIG. 2, when the driver pushes the operating end 32 in by the right thumb 81R and rotates the annular portion 31 clockwise, the control unit increases the accelerator operation amount. On the other hand, when the driver weakens the pushing force of the operating end 32, the annular portion 31 is rotated counterclockwise by the spring provided inside, and the control unit reduces the accelerator operation amount.

Figure 3:
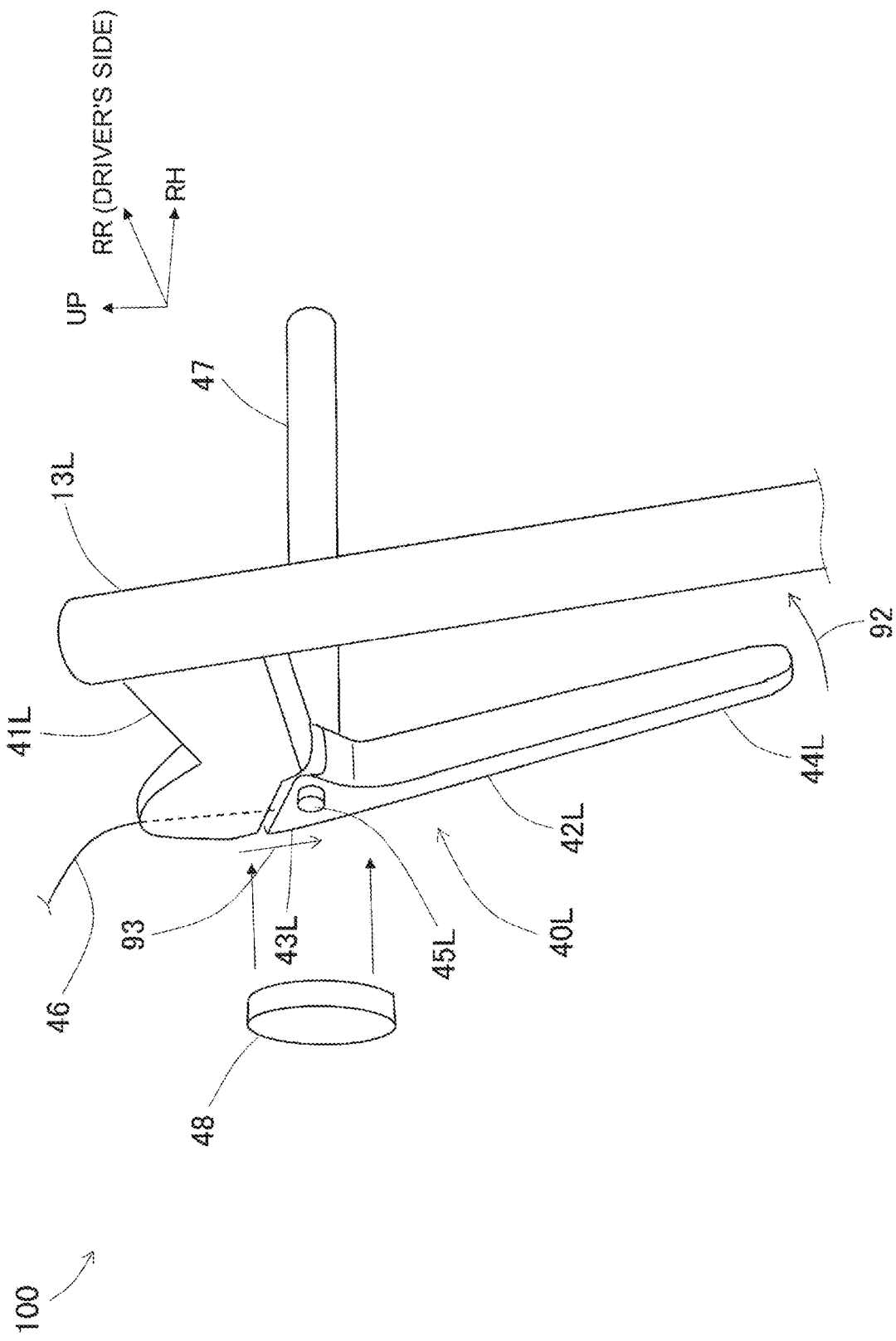
FIG. 3 is a perspective view of the brake lever shown in FIG. 1.

As shown in FIG. 3, a brake lever 40L is attached to the left leg portion 13L. The brake lever 40L includes a base portion 41L, a lever 42L, and a brake lever rotation angle sensor 48. The base portion 41L is a pedestal fixed to a vehicle-front side of the left leg portion 13L opposite to the driver side. The lever 42L is attached to the base portion 41L with a pin 45L so that the upper end portion 43L is rotatable with respect to the base portion 41L. As a result, the lower end portion 44L comes into contact with and moves away from the left leg portion 13L and moves forward and backward with respect to the driver. Further, a wire 46 connected to the braking device is connected to the upper end portion 43L. The brake lever rotation angle sensor 48 detects the rotation angle of the upper end portion 43L and inputs the detected rotation angle to the control unit.

When the driver grasps the lower end portion 44L and pulls the lower end portion 44L toward the driver as indicated by an arrow 92 in FIG. 3, the upper end portion 43L of the lever 42L moves in a direction in which the distal end is separated from the base portion 41L as indicated by an arrow 93 in FIG. 3. As a result, the upper end portion 43L pulls the wire 46 downward, and the braking device operates. Also, when the driver grasps the lower end portion 44L and pulls the lower end portion 44L toward the driver, the upper end portion 43L rotates about the pin 45L. The brake lever rotation angle sensor 48 detects the rotation angle of the upper end portion 43L and inputs the detected rotation angle to the control unit. The control unit increases the braking force by operating the brake device in accordance with the input rotation angle. Conversely, when the driver weakens the grip on the lower end portion 44L and moves the lower end portion 44L away from the driver, the wire 46 is loosened and the braking device is stopped. In addition, the control unit stops the braking device by rotating the upper end portion 43L in the opposite direction.

As described above, the brake lever 40L is attached such that the lower end portion 44L is in contact with and separated from the left leg portion 13L, and the upper end portion 43L is rotatably attached to the left leg portion 13L so that the lower end portion 44L moves forward and backward with respect to the driver. The brake lever 40L adjusts the braking force according to the stroke of the lower end portion 44L with respect to the left leg portion 13L.

A brake lever 40L attached to the left leg portion 13L and a symmetrical brake lever 40R are attached to the right leg portion 13R. Since the configuration of the brake lever 40R is the same as that of the brake lever 40L, explanation thereof will be omitted.

The upper end portion 43L of the brake lever 40L attached to the left leg portion 13L and the upper end portion (not shown) of the brake lever 40R attached to the right leg portion 13R are coupled to each other by a coupling device 47. The coupling device 47 is a rod-shaped member rotatably supported in front of the base 20, and rotates the left and right brake lever 40L, 40R together. The coupling device 47 can operate the brake device in either or both of the left and right brake lever 40L, 40R.

Figure 4:
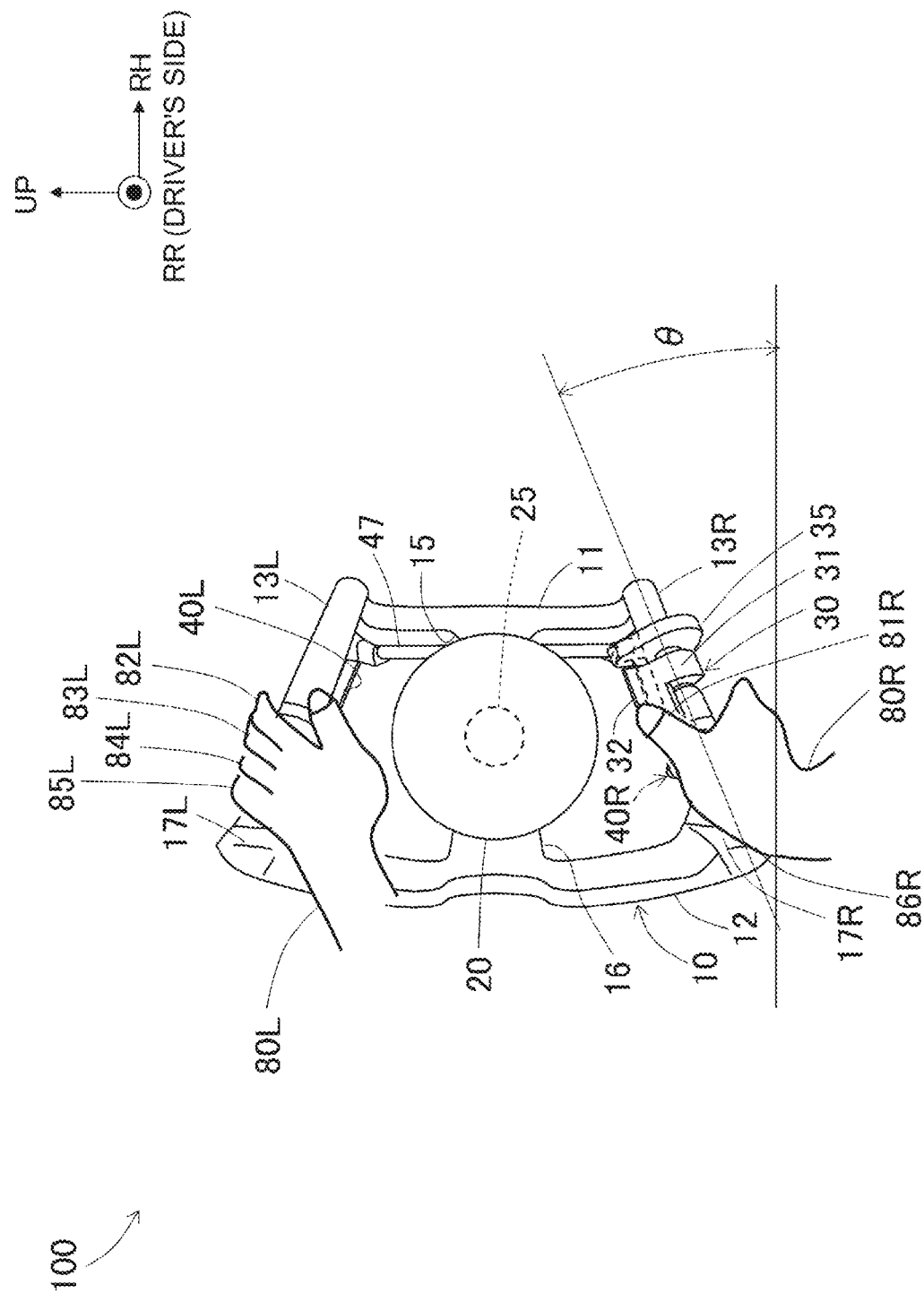
FIG. 4 is an elevation view of the vehicle steering handle shown in FIG. 1 rotated 90 degrees rightward by the driver.

Next, the operation of the vehicle steering handle 100 by the driver will be described with reference to FIG. 4. The vehicle steering handle 100 is rotationally driven in a range of 90 degrees from the neutral state shown in FIG. 1 to the left and right respectively. FIG. 4 shows a state in which the driver rotates the steering wheel 10 by 90 degrees, which is the maximum angle to the right.

The steering wheel 10 is an isosceles trapezoidal ring whose lower bottom portion 12 is longer than the upper bottom portion 11, and as shown in FIG. 4, when rotated 90 degrees in the right direction, the right leg portion 13R comes to a position extending in the right obliquely upward direction by an angle θ (about 20 degrees in the present embodiment). Therefore, the driver can hold the steering wheel 10 at a position of 90 degrees to the right by bending the wrist of the right hand 80R by (90 degrees-θ). Further, since the bending angle of the wrist is smaller than 90 degrees, the operating end 32 of the accelerator lever 30 can be easily pushed in by the right thumb 81R. At this time, the driver can grasp the left leg portion 13L with the left hand 80L and operate the brake lever 40L with the left index finger 82L, middle finger 83L, ring finger 84L, and little finger 85L.

In addition, the vehicle steering handle 100 is provided at both ends of the lower bottom portion 12 with a left leg portion 13L and a rotary operating portion 17R protruding toward the driver side from the driver side of the right leg portion 13R. Accordingly, the driver can steer the vehicle by rotating the steering wheel 10 by pushing the rotation operating portion 17R on the palm 86R without gripping the steering wheel 10. Therefore, the burden of the driver's driving operation can be reduced.

As described above, the vehicle steering handle 100 according to the embodiment can be easily operated by the driver and can reduce the burden on the driver.

Next, a vehicle steering handle 200 according to another embodiment will be described with reference to FIG. 5. The same parts as those of the vehicle steering handle 100 described above with reference to FIGS. 1 to 4 are denoted by the same reference numerals, and description thereof will be omitted.

The vehicle steering handle 200 is provided with a turn switch 60 and a wiper switch 50 on the left leg portion 13L. Other configurations are the same as those of the vehicle steering handle 100 described above.

As shown in FIG. 5, the turn switch 60 includes a casing 61 attached to the left leg portion 13L, a push-type L switch 62 attached to the casing 61, and an R switch 63. When the driver presses the L switch 62, the left blinker blinks, and when the driver presses the R switch 63, the right blinker blinks.

Similarly, the wiper switch 50 includes a casing 51 attached to the left leg portion 13L, a push-type AUTO button 52 attached to the casing 51, an OFF button 53, and a MIST button 54. When the driver presses the AUTO button 52, the wiper is activated and stopped in response to rain. Further, when the driver presses the MIST button 54, the wiper starts operation, and when the driver presses the OFF button 53, the operation of the wiper is stopped.

As described above, the vehicle steering handle 200 is provided with the push-type turn switch 60 and the push-type wiper switch 50 on the left leg portion 13L. Therefore, when the driver grasps the left leg portion 13L of the steering wheel 10, the turn switch 60 and the wiper switch 50 can be operated in addition to the steering, the acceleration, and the deceleration of the vehicle. Thus, the driving operation is easy, and the burden of the driving operation by the driver can be reduced.

In the above-described vehicle steering handles 100 and 200, the accelerator lever 30 is disposed on the right leg portion 13R, and the brake lever 40L, 40R is disposed on the left leg portion 13L and the right leg portion 13R, respectively.

For example, the accelerator lever 30 may be disposed on the left leg portion 13L, or the accelerator lever 30 may be disposed on the left leg portion 13L and the right leg portion 13R. In addition, the brake lever 40L, 40R may be disposed on one of the left leg portion 13L and the right leg portion 13R.

Further, in the above description, the brake lever 40L has been described as including the wire 46 connected to the brake device and the brake lever rotation angle sensor 48 that detects the rotation angle of the upper end portion 43L and inputs it to the control unit. However, the present disclosure is not limited thereto, and a configuration may be adopted in which one of the wire 46 and the brake lever rotation angle sensor 48 is provided.

In the above description, the steering wheel 10 is connected to the base 20 by the upper spoke 15 and the lower spoke 16, but the present disclosure is not limited thereto. For example, the left leg portion 13L, the right leg portion 13R, and the base 20 may be connected by left and right spokes, and may be configured not to include the upper spoke 15 and the lower spoke 16.

Further, in the above description, the vehicle steering handle 100 has been described as being rotationally driven in a range of 90 degrees from the neutral state shown in FIG. 1 to the left and right, respectively. However, the present disclosure is not limited thereto, and may be configured to be rotationally driven, for example, in a range of 70 degrees to 110 degrees for each of the left and right sides.

Further, in the above description, the steering wheel 10 is described as an isosceles trapezoidal ring including the upper bottom portion 11, the lower bottom portion 12 longer than the upper bottom portion 11, and the left leg portion 13L and the right leg portion 13R, but the present disclosure is not limited thereto. For example, the lower bottom portion 12 may be an isosceles trapezoidal annular body that is longer than the upper bottom portion 11, or may be a trapezoidal annular body that differs in length between the left leg portion 13L and the right leg portion 13R.

Further, in the above description, the left brake lever 40L and the right brake lever 40R are described as being symmetrical to each other, but the present disclosure is not limited thereto. For example, the length of the right lever (not shown) may be shorter than the length of the left lever 42L.

In the above description, the turn switch 60 and the wiper switch 50 have been described as a push type, but other types of switches, for example, touch switches, may be used.

What is claimed is:

1. A vehicle steering handle configured to be attached to a vehicle, comprising:
    a steering wheel that is an isosceles trapezoid annular body including
        an upper base portion,
        a lower base portion that is longer than the upper base portion,
        a right leg portion connecting a right end of the upper base portion and a right end of the lower base portion, and
        a left leg portion connecting a left end of the upper base portion and a left end of the lower base portion;
    an accelerator lever attached to the right leg portion; and
    a right brake lever and a left brake lever attached to the right leg portion and the left leg portion, respectively, wherein
    the accelerator lever includes an annular portion and a plate-shaped operation portion extending from an outer surface of the annular portion to an inward side of the steering wheel,
    the annular portion is rotatably attached to the right leg portion such that the right leg portion is passed through a hole of the annular portion,
    the plate-shaped operation portion includes a first edge and a second edge opposite to the first edge, the first edge being partially connected to the outer surface of the annular portion, and the second edge being a free edge, and
    the plate-shaped operation portion is configured to rotate around the right leg portion to adjust an accelerator operation amount according to a rotation angle of the plate-shaped operation portion.

2. The vehicle steering handle according to claim 1, wherein:
    the right leg portion and the left leg portion are inclined with respect to an up-down direction of the vehicle steering handle in a state where the vehicle steering handle is attached to the vehicle and the vehicle steering handle is in a neutral position, such that an angle of inclination of each of the right leg portion and the left leg portion is in a range of 10 to 30 degrees with respect to the up-down direction.

3. The vehicle steering handle according to claim 1, wherein:
    each of the right brake lever and the left brake lever includes an upper end portion rotatably attached to the corresponding one of the right leg portion and the left leg portion, wherein a lower end portion of each of the right brake lever and the left brake lever approaches to and separates from the corresponding one of the right leg portion and the left leg portion and the lower end portion of each of the right brake lever and the left brake lever moves forward and backward with respect to a driver side, and
    each of the right brake lever and the left brake lever is configured to adjust a braking force according to a stroke of the lower end portion with respect to the corresponding one of the right leg portion and the left leg portion.

4. The vehicle steering handle according to claim 3, wherein the upper end portion of the right brake lever and the upper end portion of the left brake lever are coupled to each other by a coupling rod.

5. The vehicle steering handle according to claim 3, further comprising a rotation angle sensor that is attached to the left brake lever and that is configured to detect a rotation angle of the upper end portion of the left brake lever.

6. The vehicle steering handle according to claim 1, further comprising a turn switch and a wiper switch provided on one or both of the right leg portion and the left leg portion.

7. The vehicle steering handle according to claim 1, further comprising a central base disposed at a center of the steering wheel and connected to a steering column of the vehicle, wherein
    the upper base portion is connected to an upper end of the central base via an upper spoke, and
    the lower base portion is connected to a lower end of the central base via a lower spoke.

8. The vehicle steering handle according to claim 1, wherein
    the lower base portion has a right end and a left end each including a protrusion, the protrusion protruding toward a side of a driver with respect to a surface of the right leg portion and the left leg portion.

9. The vehicle steering handle according to claim 1, further comprising an accelerator angle sensor that is attached to the right leg portion and that is configured to detect an angular position of the annular portion of the accelerator lever.

10. The vehicle steering handle according to claim 1, further comprising a turn switch and a wiper switch provided on the left leg portion, wherein
    the turn switch includes a turn switch casing attached to the left leg portion, and a first turn switch button and a second turn switch button that are disposed on the casing,
    the first turn switch button is configured to turn on a left blinker of the vehicle, and
    the second turn switch button is configured to turn on a right blinker of the vehicle.

11. The vehicle steering handle according to claim 10, wherein:
    the wiper switch includes a wiper switch casing attached to the left leg portion and a plurality of wiper switch buttons disposed on the wiper switch casing, and
    the plurality of wiper switch buttons is configured to activate or deactivate an operation of a wiper of the vehicle when operated by a driver of the vehicle.

* * * * *